(12) United States Patent
Dunn et al.

(10) Patent No.: US 10,182,665 B2
(45) Date of Patent: Jan. 22, 2019

(54) SYSTEM AND METHOD FOR PREVENTING DAMAGE TO PRODUCTS

(71) Applicant: Manufacturing Resources International, Inc., Alpharetta, GA (US)

(72) Inventors: William Dunn, Alpharetta, GA (US); Rick De Laet, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 44 days.

(21) Appl. No.: 14/882,021

(22) Filed: Oct. 13, 2015

(65) Prior Publication Data

US 2016/0106231 A1 Apr. 21, 2016

Related U.S. Application Data

(60) Provisional application No. 62/064,304, filed on Oct. 15, 2014.

(51) Int. Cl.
| | |
|---|---|
| *A47F 3/00* | (2006.01) |
| *A47F 3/04* | (2006.01) |
| *G06F 3/14* | (2006.01) |
| *G09G 3/34* | (2006.01) |

(Continued)

(52) U.S. Cl.
CPC .............. *A47F 3/043* (2013.01); *A47F 3/001* (2013.01); *A47F 3/0404* (2013.01); *A47F 3/0434* (2013.01); *A47F 11/10* (2013.01); *G06F 3/1423* (2013.01); *G09G 3/3406* (2013.01); *G09G 3/36* (2013.01); *G09G 2320/06* (2013.01); *G09G 2320/08* (2013.01); *G09G 2330/021* (2013.01);

(Continued)

(58) Field of Classification Search
CPC ......... G09G 3/3633; G09G 2300/0456; G09G 5/00; E06B 2009/2464; E06B 9/24; G02F 1/13318; G02B 26/02
See application file for complete search history.

(56) References Cited

U.S. PATENT DOCUMENTS

| | | | |
|---|---|---|---|
| 3,629,972 | A | 12/1971 | Rehberg et al. |
| 4,040,726 | A | 8/1977 | Paca |
| 4,299,092 | A | 11/1981 | Ibrahim |

(Continued)

FOREIGN PATENT DOCUMENTS

| | | |
|---|---|---|
| CA | 2815355 A1 | 5/2012 |
| CN | 101949526 A | 1/2011 |

(Continued)

OTHER PUBLICATIONS

PCT/EP2012/002896, Transparent display device, international filing dated Jul. 9, 2012, 40 pages.*

(Continued)

*Primary Examiner* — Kevin M Nguyen
(74) *Attorney, Agent, or Firm* — Standley Law Group LLP (57) ABSTRACT

A device and method for preventing damage to products in a display case is disclosed. The display case includes a normally black transparent liquid crystal display (LCD) which is positioned between a front and rear glass of the door. A controller is electrically connected to the LCD which drives the LCD according to transparency data. The transparency data comprises various transparency levels for the LCD depending on the time of day.

8 Claims, 7 Drawing Sheets

(51) Int. Cl.
*G09G 3/36* (2006.01)
*A47F 11/10* (2006.01)

(52) U.S. Cl.
CPC ..... *G09G 2370/02* (2013.01); *G09G 2370/16* (2013.01); *G09G 2380/04* (2013.01)

(56) References Cited

U.S. PATENT DOCUMENTS

| | | |
|---|---|---|
| 4,371,870 A | 2/1983 | Biferno |
| 4,853,678 A | 8/1989 | Bishop, Jr. et al. |
| 7,413,233 B1 | 8/2008 | Jung |
| 7,513,637 B2 | 4/2009 | Kelly et al. |
| 7,922,381 B2 | 4/2011 | Han et al. |
| 8,254,121 B2 | 8/2012 | Lee et al. |
| 8,417,376 B1 | 4/2013 | Smolen |
| 8,578,081 B1 | 11/2013 | Fils |
| 8,683,745 B2 | 4/2014 | Artwohl et al. |
| 8,982,013 B2 | 3/2015 | Sako et al. |
| 8,988,635 B2 | 3/2015 | Dunn et al. |
| 9,052,536 B2 | 6/2015 | Artwohl et al. |
| 9,155,405 B2 | 10/2015 | Artwohl et al. |
| 9,500,801 B2 | 11/2016 | Dunn |
| 9,500,896 B2 | 11/2016 | Dunn et al. |
| 9,514,661 B2 | 12/2016 | Riegel |
| 9,519,185 B2 | 12/2016 | Dunn et al. |
| 9,526,352 B2 | 12/2016 | Dunn et al. |
| 9,535,293 B2 | 1/2017 | Dunn |
| 9,633,366 B2 | 4/2017 | Dunn |
| 9,661,939 B2 | 5/2017 | Dunn et al. |
| 9,684,124 B2 | 6/2017 | Dunn |
| 9,733,420 B2 | 8/2017 | Dunn et al. |
| 2002/0064037 A1 | 5/2002 | Lee |
| 2002/0075552 A1 | 6/2002 | Poll et al. |
| 2002/0187575 A1 | 12/2002 | Maruyama et al. |
| 2003/0117790 A1 | 6/2003 | Lee et al. |
| 2004/0160388 A1 | 8/2004 | O'Keeffe |
| 2005/0265019 A1 | 12/2005 | Sommers et al. |
| 2006/0215958 A1 | 9/2006 | Yeo et al. |
| 2006/0284788 A1 | 12/2006 | Robinson et al. |
| 2007/0151274 A1 | 7/2007 | Roche et al. |
| 2007/0171647 A1 | 7/2007 | Artwohl et al. |
| 2007/0195535 A1 | 8/2007 | Artwohl et al. |
| 2007/0214812 A1 | 9/2007 | Wagner et al. |
| 2008/0024047 A1 | 1/2008 | Juo et al. |
| 2008/0055534 A1 | 3/2008 | Kawano |
| 2008/0094854 A1 | 4/2008 | Coleman et al. |
| 2008/0284942 A1 | 11/2008 | Mahama et al. |
| 2008/0295033 A1 | 11/2008 | Lee et al. |
| 2009/0002990 A1 | 1/2009 | Becker et al. |
| 2009/0015400 A1 | 1/2009 | Breed |
| 2009/0097227 A1 | 4/2009 | Kim et al. |
| 2009/0121970 A1 | 5/2009 | Ozbek |
| 2009/0278766 A1 | 11/2009 | Sako et al. |
| 2009/0300953 A1 | 12/2009 | Frisch et al. |
| 2010/0026912 A1 | 2/2010 | Ho |
| 2010/0162747 A1 | 7/2010 | Hamel et al. |
| 2010/0238394 A1 | 9/2010 | Dunn |
| 2010/0293827 A1 | 11/2010 | Suss et al. |
| 2010/0309687 A1 | 12/2010 | Sampsell et al. |
| 2011/0083460 A1 | 4/2011 | Thomas et al. |
| 2011/0116000 A1 | 5/2011 | Dunn et al. |
| 2011/0116231 A1 | 5/2011 | Dunn et al. |
| 2012/0020560 A1 | 1/2012 | Zarubinsky |
| 2012/0105424 A1* | 5/2012 | Lee ............... G09F 9/35 345/212 |
| 2012/0105428 A1 | 5/2012 | Fleck et al. |
| 2012/0206500 A1 | 8/2012 | Koprowski et al. |
| 2012/0206941 A1 | 8/2012 | He |
| 2012/0275477 A1 | 11/2012 | Berendt et al. |
| 2012/0287368 A1 | 11/2012 | Que et al. |
| 2013/0016296 A1 | 1/2013 | Fujita et al. |
| 2013/0063326 A1 | 3/2013 | Riegel |
| 2013/0120815 A1 | 5/2013 | Aspnes et al. |
| 2013/0151006 A1 | 6/2013 | Garson et al. |
| 2013/0158703 A1 | 6/2013 | Lin et al. |
| 2013/0208447 A1 | 8/2013 | Maslen |
| 2013/0211583 A1 | 8/2013 | Borra |
| 2013/0265525 A1 | 10/2013 | Dunn et al. |
| 2013/0271696 A1 | 10/2013 | Dunn |
| 2014/0062316 A1 | 3/2014 | Tischler et al. |
| 2014/0078407 A1 | 3/2014 | Green et al. |
| 2014/0085564 A1 | 3/2014 | Hendren et al. |
| 2014/0104538 A1 | 4/2014 | Park et al. |
| 2014/0137065 A1 | 5/2014 | Feng et al. |
| 2014/0144083 A1 | 5/2014 | Artwohl et al. |
| 2014/0204452 A1* | 7/2014 | Branson ............ G02B 26/004 359/290 |
| 2014/0285732 A1 | 9/2014 | Tanabe et al. |
| 2014/0333541 A1 | 11/2014 | Lee et al. |
| 2015/0035432 A1 | 2/2015 | Kendall et al. |
| 2015/0177480 A1* | 6/2015 | Bullock ............ G02B 27/0006 359/512 |
| 2015/0250021 A1 | 9/2015 | Stice et al. |
| 2015/0253612 A1 | 9/2015 | Hasegawa et al. |
| 2015/0300628 A1 | 10/2015 | Dunn et al. |
| 2015/0309263 A2 | 10/2015 | Abovitz et al. |
| 2015/0338715 A1* | 11/2015 | Schaefer ............ G02F 1/13 362/92 |
| 2015/0362667 A1 | 12/2015 | Dunn |
| 2015/0362768 A1 | 12/2015 | Dunn |
| 2015/0362792 A1 | 12/2015 | Dunn et al. |
| 2015/0363819 A1 | 12/2015 | Dunn |
| 2015/0366083 A1 | 12/2015 | Dunn et al. |
| 2016/0037657 A1 | 2/2016 | Yoshizumi |
| 2016/0061514 A1 | 3/2016 | Seo et al. |
| 2016/0091755 A1 | 3/2016 | Dunn |
| 2016/0095450 A1 | 4/2016 | Trulaske, Sr. |
| 2016/0103275 A1 | 4/2016 | Diaz et al. |
| 2016/0106231 A1 | 4/2016 | Dunn et al. |
| 2016/0192451 A1 | 6/2016 | Dunn et al. |
| 2017/0046991 A1 | 2/2017 | Riegel |
| 2017/0068042 A1 | 3/2017 | Dunn et al. |
| 2017/0068044 A1 | 3/2017 | Dunn |
| 2017/0099960 A1 | 4/2017 | Dunn et al. |
| 2017/0108735 A1 | 4/2017 | Dunn |
| 2017/0228770 A1 | 8/2017 | Dunn |
| 2017/0256115 A1 | 9/2017 | Diaz |

FOREIGN PATENT DOCUMENTS

| | | |
|---|---|---|
| CN | 202815379 | 3/2013 |
| CN | 202815379 U | 3/2013 |
| EP | 3155607 A1 | 4/2017 |
| JP | 2010171010 A | 8/2010 |
| JP | 5173088 B1 | 3/2013 |
| KR | 1020040045939 A | 6/2004 |
| KR | 20120044874 | 5/2012 |
| WO | WO2006055873 A2 | 5/2006 |
| WO | WO2010116202 A1 | 10/2010 |
| WO | WO2013056109 A1 | 4/2013 |
| WO | WO2015195681 A1 | 12/2015 |
| WO | WO2017151934 A1 | 9/2017 |

OTHER PUBLICATIONS

A. Vogler & H. Kunkley, Photochemistry and Beer, Jan. 1982, 3 pages, vol. 59, No. 1.
Dave Roos, How Transmissive Film Works, 2008, 9 Pages.
Pilkington TEC Glass, For the Refrigeration Market, 2002, 2 Pages.

* cited by examiner

SYSTEM AND METHOD FOR PREVENTING DAMAGE TO PRODUCTS

CROSS-REFERENCE TO RELATED APPLICATIONS

This application claims the priority of U.S. Provisional Application No. 62/064,304 filed Oct. 15, 2014.

TECHNICAL FIELD

Embodiments generally relate to systems for tracking and analyzing the use of liquid crystal displays (LCD) within display cases.

BACKGROUND OF THE ART

Display cases are used in a number of different retail establishments for illustrating the products that are available for sale. In some instances these display cases may be refrigerated or non-refrigerated and may be placed in grocery stores, convenience stores, gas stations, restaurants, stadiums, race tracks, bakery, deli, hotels, or other retail establishments. It is desirable to place the products within a transparent housing, so that the customer can view them and hopefully make a purchase.

However, it has been discovered that exposure to light, or more generally electromagnetic radiation, both visible and invisible can cause a product to degrade. In some instances, the product may be an organic product where exposure to various wavelengths of radiation may cause the proteins or other components to break down. In other instances, the products may be inorganic but may contain materials (ex. plastics) which may degrade from exposure to various wavelengths of radiation. While it is desirable to offer the products in transparent cases, the exposure to radiation is undesirable as it will limit the shelf life of the product.

SUMMARY OF THE EXEMPLARY EMBODIMENTS

An exemplary embodiment replaces at least one side of a display case with a liquid crystal display (LCD). In some embodiments, the lighting for the display case can be provided entirely within a front glass assembly which also contains the LCD. Preferably, the LCD is a normally-black LCD which can be described as an LCD which is opaque or black when voltage is not applied to the pixel electrodes. However, some embodiments of the invention may be practiced with a normally white LCD.

In one embodiment, the LCD can be used in a simple on/off manner, where the LCD is made transparent during open retail hours but is then made opaque during after-hours. When using a normally black LCD, the subpixels may be driven at a high voltage during retail hours but then completely turned off during after-hours.

In another embodiment, the transparency of the LCD may be varied depending on the time of day, feedback from an ambient light sensor, presence of a consumer, or the activity of a display case door opening/closing. During times of non-use, the LCD can be turned off so that when using a normally black LCD the products will be shielded from various wavelengths of radiation, extending their shelf life.

In another embodiment, the lighting for the display case as well as the LCD may be embedded within a front glass unit where the amount of lighting can also be varied in addition to the transparency of the LCD.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figures 1, 2:
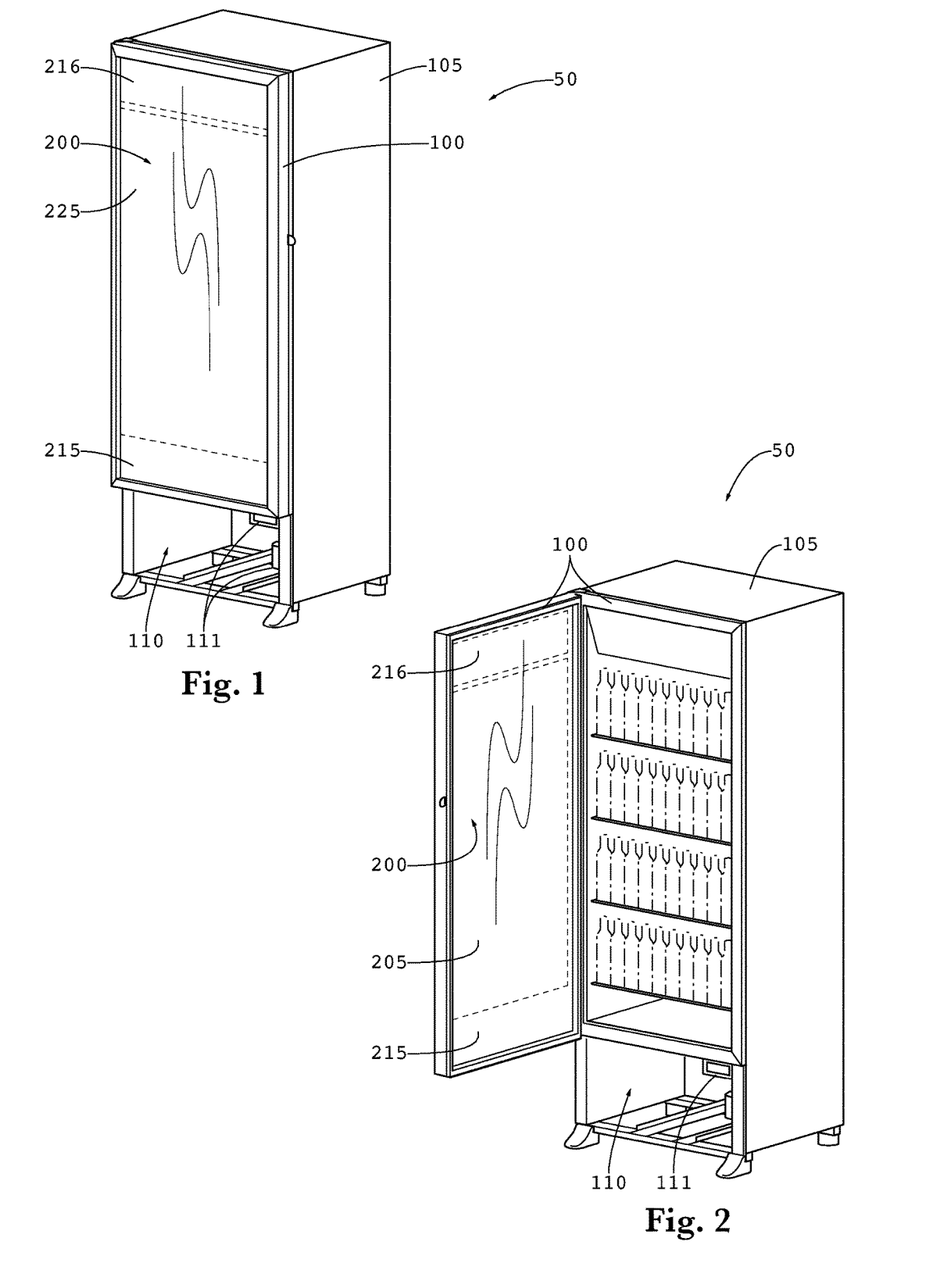
FIG. 1 is a perspective view of a refrigerated display case having a LCD assembly.
FIG. 2 is a perspective view of the refrigerated display case of FIG. 1 where the door has been opened.

FIG. 1 is a perspective view of a refrigerated display case 50 having a LCD 200. Generally, the display case includes a housing 105, to which a front window assembly 100 is fastened. In this embodiment, a cavity 110 is provided below the front window assembly 100 where various electronic devices 111 for operating the LCD assembly 200 can be located.

FIG. 2 is a perspective view of the refrigerated display case of FIG. 1 where the door has been opened. In this embodiment, the front window assembly 100 is hingedly fastened to the housing 105, although this is not required. The LCD 200 is preferably sandwiched between a front glass 225 and rear glass 205. Also preferably sandwiched between the front and rear glass 225/205 is an upper plate 216 and a lower plate 215, each of which are preferably attached to the rear glass 225 such that heat from the plates can be conductively transferred to the rear glass 225 and removed by natural or forced convection.

In an exemplary embodiment, the upper and lower plates are preferably bonded to the rear glass 205 through adhesive transfer tape. An exemplary adhesive transfer tape for this purpose would be 468 MP, available commercially from 3M™ of St. Paul, Minn. www.3M.com/converter. In order to illuminate the LCD 200, one or more printed circuit boards (PCBs) each containing a plurality of LEDs is preferably in conductive thermal communication with either the upper, lower, or both plates. In this way, heat that is generated by the LEDs can be transmitted to the PCB and eventually transferring to the rear glass 205 where the heat can dissipate through natural or forced convection.

Figure 3:
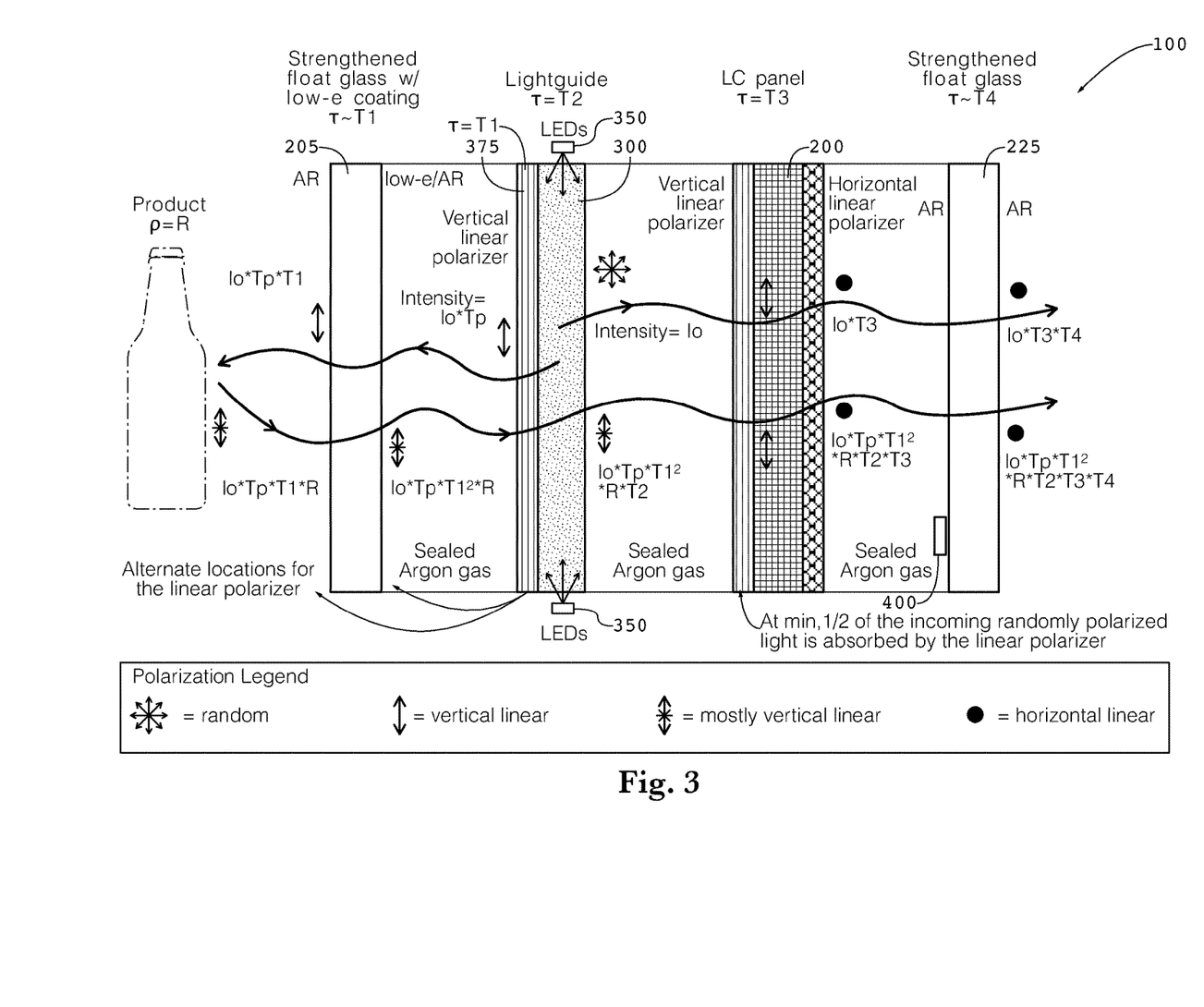
FIG. 3 is a simplified side view of the various layers within an exemplary front window assembly.

FIG. 3 is a simplified side view of the various layers within an exemplary front window assembly 100. Various electronic components 400 for operating the LCD 200 and communicating with the front window assembly 100 can be placed within the sealed assembly. In some embodiments, the electronic components 400 can be mounted to the front glass 225 or the rear glass 205. A light guide 300 and the LCD 200 are preferably sealed between the front glass 225 and rear glass 205. The sealed enclosure is preferably filled with argon gas. A plurality of LEDs 350 may be arranged along opposing edges of the light guide 300. In an exemplary embodiment, an optional additional linear polarizer 375 is positioned behind the light guide 300. The optional additional linear polarizer 375 could be attached to the rear surface of the light guide 300, front surface of the rear glass 205, or the rear surface of the rear glass 205. As noted above, the LCD 200 is preferably a normally-black LCD.

Figure 4:
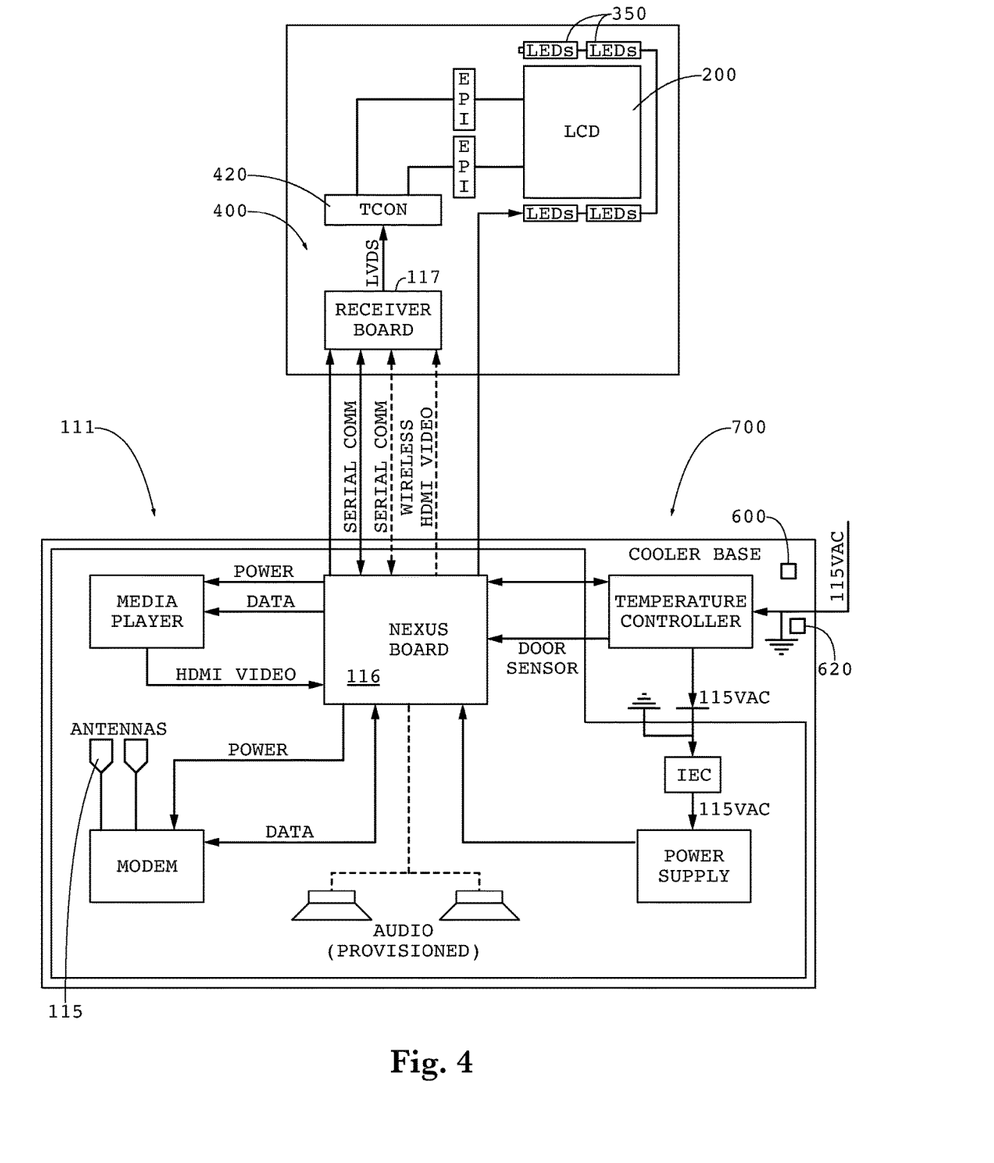
FIG. 4 is an electrical block diagram for an exemplary embodiment.

FIG. 4 is a block diagram for an exemplary embodiment of the electronic components 400 within the front window assembly as well as the electronic components 111 in the cavity 110 below the front window assembly. The antennas 115 can be cellular network antennas or can be Wi-Fi receiving devices. In some embodiments, the modem may be connected through a hard-wired internet connection rather than cellular or wireless. Preferably, the video signal from the media player is transmitted to the receiving board 117 through wireless communication, although this is not required.

The board 116 and the Receiver board 117 each contain a wireless device for communicating back and forth between the two boards and can operate under any form of wireless networking technology, including but not limited to: WPAN, WLAN, a wireless mesh network, or GAN. Specifically regarding the architecture for a WLAN network, these could include but are not limited to stations, basic service set, extended service set, and a distribution system. Further regarding the types of wireless LANs, these could include but are not limited to peer-to-peer, bridge, and a wireless distribution system. Any form of general encryption method can be used with the exemplary embodiments herein.

The board 116 and the receiver board 117 each preferably contain a microprocessor and a storage device (RAM).

The cooler base 700 preferably contains electrical circuitry to communicate various attributes of the cooler to the board 116. The cooler attributes that can be communicated include, but are not limited to: evaporator temperature, cooler temperature, door open/close status, energy saving mode status, compressor status, evaporator fan status, and defrost status. The board 116 can then transmit the cooler attributes to a remote user through the modem. The board 116 can also record and transmit various attributes of the board 116 as well as the media player. These attributes can include but are not limited to: video input status, video resolution, voltage/current, and board temperature.

The board 116 can also communicate several alarm conditions, including but not limited to: temperature sensor failures, receiver board 117 communication failures, invalid defrost temperature, defrost timeout, missed defrost cycle, high/low temp exceeded, invalid video input, and video input stalled.

Also shown in this figure is the temperature sensor 620 which is in electrical communication with the electronic devices 111. Also shown here is a door sensor 600 which is positioned to determine whether the front window assembly is currently open or not (if using a hinging front window assembly 100).

A timing and control board (TCON) 420 is shown in electrical communication with the receiver board 117 and the LCD 200. It should be noted that the LEDs 350 are not required, as some embodiments may utilize ambient lighting or lighting within the display case to backlight the LCD 200.

The LCD 200 may operate various pixels by applying a voltage to them. During normal operations, the LCD 200 may display pixels at various transparency levels in order to generate colored pixels that assemble to display a graphic. In exemplary embodiments, the modem may receive transparency data that is transmitted to the LCD 200 by way of the board 116. The transparency data may include data that instructs the LCD 200 to drive each pixel at substantially the same transparency level. An exemplary embodiment of the method for preventing damages to the products of the display case 50 may include the step of operating each sub-pixel of the LCD 200 at a predetermined uniform transparency level by way of the controller and according to the transparency data. In other words, in some embodiments, each sub-pixel of the LCD 200 is generally driven to substantially the same level of transparency (sometimes this means applying the same sub-pixel voltages to each sub-pixel).

Figure 5:
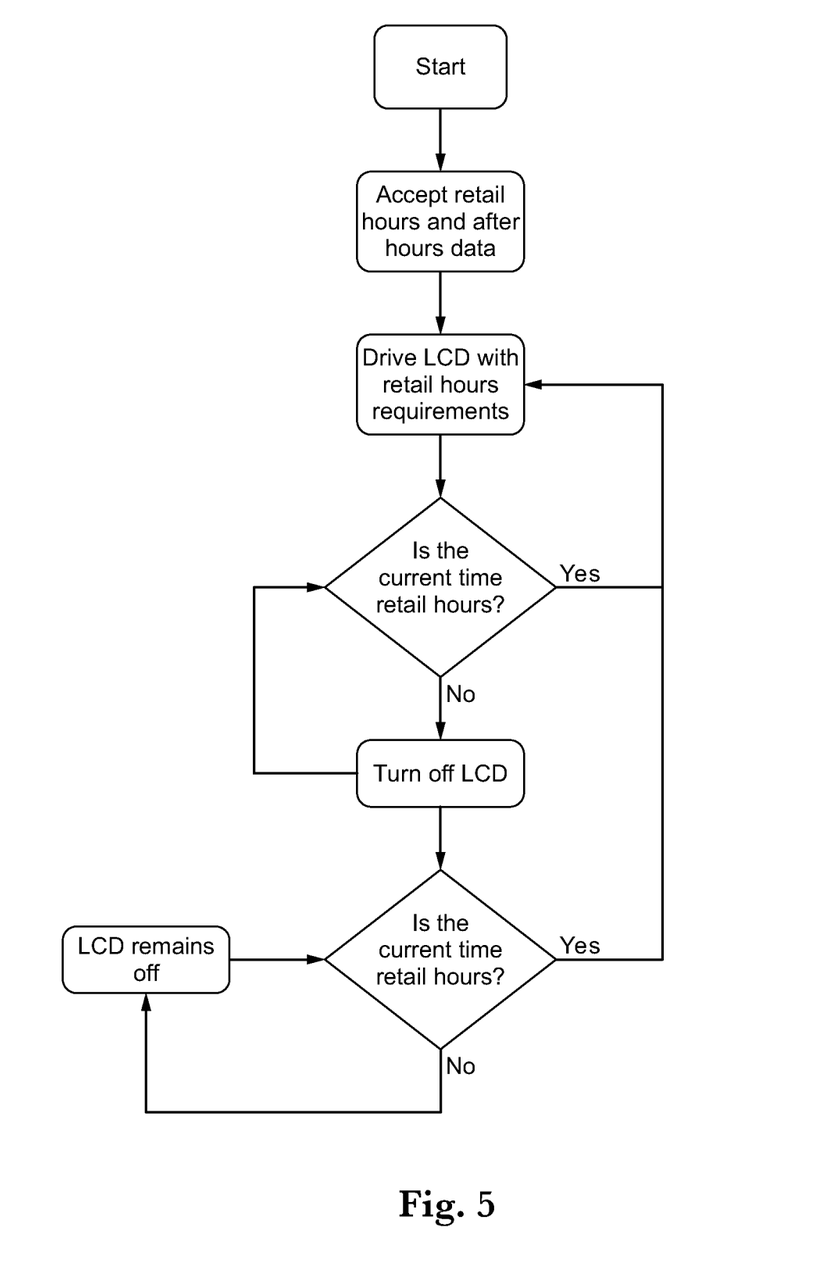
FIG. 5 is a flow chart for a first embodiment for operating the method to prevent damage to products.

FIG. 5 is a flow chart for a first embodiment for operating the method to prevent damage to products. A user may input a schedule for the retail hours and the after hours. This schedule can be accepted and stored in a number of ways. The schedule can be a weekly hour-by-hour schedule, which is uploaded only once and gives the schedule for Monday- Sunday to be performed by the software every week. In other embodiments, the schedule may be a daily schedule, which is uploaded for a single 24 hour period and is repeated for every single day. In other embodiments, the schedule may be a full calendar with daily specifics as to what the retail hours and the after hours will be specifically for each day. Other embodiments may have the system simply presume retail hours and only accept after hours data for each specific day, weekly schedule, or daily schedule.

In some embodiments, during retail hours the LCD 200 is simply controlled to be substantially transparent, i.e. enough voltage is sent from the TCON 420 to the LCD 200 to obtain a desired level of transparency. In other embodiments, during retail hours the LCD 200 may be driven as transparent and may also contain images and advertisements, sent from the media player to the board 116 and ultimately to the TCON 420. The images and advertisements can be transmitted to the media player from the board 116, after being received at the modem.

The user may communicate the various retail and after hours data to the board 116 in a number of ways. First, the user can physically connect to the modem 115 (using a cable, ex. Ethernet/DSL cable). Second, the user can communicate though the modem 115 by using any internet connection with a remote device. Third, the user can communicate through the modem 115 by using cellular antennas 115 (shown in electrical communication with the modem 115) and a cellular device. The logic is preferably operated by the microprocessor located on the board 116.

Figure 6:
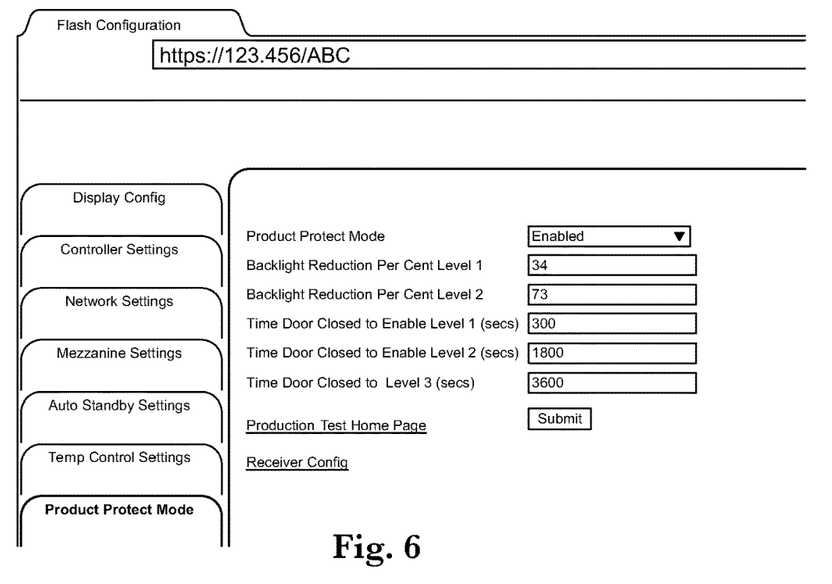
FIG. 6 is a screen shot of an exemplary user interface for operating a method for preventing damage to products when using an optional LED backlight with the LCD.

FIG. 6 is a screen shot of an exemplary user interface for operating a method for preventing damage to products when using an optional LED 350 backlight with the LCD 200. The product protection mode can be 'enabled' or 'disabled.' The user can select a backlight reduction percent level 1, which provides the percentage of power reduction to the backlight when level 1 power saving is detected. In this example, the level 1 power reduction is 34%. The user can also select how long the door remains closed before initiating level 1 power saving. In this embodiment, level 1 power saving is initiated once the door has been closed for 300 seconds.

Optionally, the user can select a number of backlight reduction levels. Here, the embodiment permits the selection of backlight reduction percent level 2, which provides the percentage of power reduction to the backlight when level 2 power saving is detected. In this example, the level 2 power reduction is 73%. The user can also select how long the door remains closed before initiating level 2 power saving. In this embodiment, level 2 power saving is initiated once the door has been closed for 1800 seconds.

In this embodiment, the user can also select how long the door should be closed before the LCD is turned off to protect the products (shown in this Figure as Level 3). Here, the LCD would be turned off with no power sent to the TCON 420 once the door has been closed for 3600 seconds.

Figure 7:
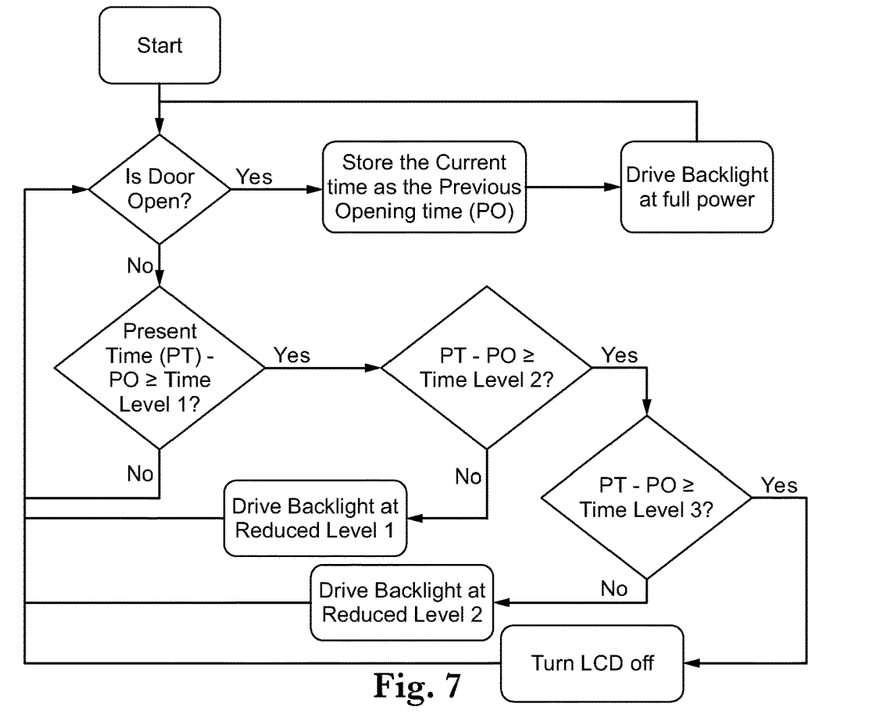
FIG. 7 is a flow chart for an exemplary logic structure for operating one embodiment of the product protect mode.

FIG. 7 is a flow chart for an exemplary logic structure for operating the optional product protect mode. The system first checks the sensor 600 to determine if the door is open. If yes, the current time is stored as the Previous Opening time (PO) and the backlight is driven at full power. If the door is closed, the present time is compared to the PO to determine how much time has elapsed since the previous door opening. If the time elapsed is not greater than Time Level 1 (ex. 300 seconds), the backlight continues to be driven at full power. If the time elapsed is greater than Time Level 1, the system moves on to compare the time elapsed with Time Level 2 (ex. 1800 seconds). If the time elapsed is less than Time Level 2, the backlight is driven at reduced level 1 (ex. 34% of full power). If the time elapsed is greater than Time Level 2, the system moves on to compare the time elapsed with Time Level 3 (ex. 3600 seconds). If the time elapsed is less than Time Level 3, the backlight is driven at reduced level 2 (ex. 73% of full power). If the time elapsed is greater than Time Level 3, the LCD is turned off (ex. no power is sent to the TCON 420).

Figure 8:
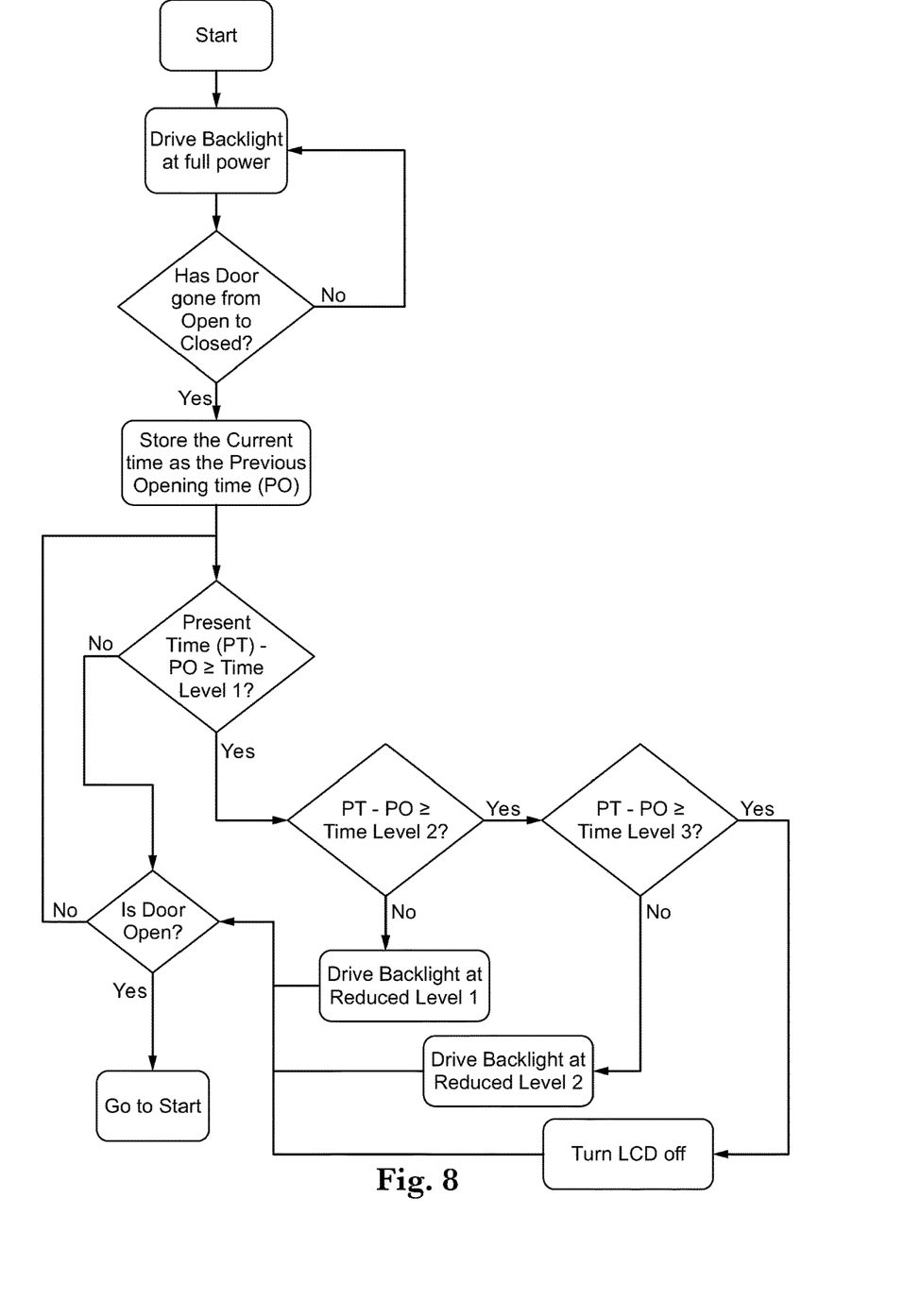
FIG. 8 is a flow chart for another exemplary logic structure for operating one embodiment of the product protect mode.

FIG. 8 is a flow chart for another exemplary logic structure for operating the optional product protect mode. The system preferably begins by driving the backlight at full power. Next, the sensor 600 is checked to determine if the door has gone from opened to closed. If not, the system continues to drive the backlight at full power and continues to monitor the sensor 600. If yes, the current time is stored as the Previous Opening time (PO) and the logic moves forward to determine how much time has elapsed since the PO. If the time elapsed is less than Time Level 1, the door sensor 600 is again checked and if the door is still closed the system will return to measure the elapsed time since the PO, if however the door has been opened the system will return to the start where the backlight is driven at full power.

If the time elapsed is greater than Time Level 1, the system then preferably compares the elapsed time since the PO and compares it to Time Level 2. If the elapsed time is less than Time Level 2, the backlight is preferably driven at Reduced Level 1. If the elapsed time is greater than Time Level 2, the system preferably then compares the elapsed time since the PO and compares it to Time Level 3. If the elapsed time is less than Time Level 3, the backlight is preferably driven at Reduced Level 2. If the elapsed time is greater than Time Level 3, the LCD is turned off. In either scenario the system will preferably again check the sensor 600 and if the door has been opened the system will return to the start where the backlight is driven at full power. If however the door remains closed, the system will preferably return to the logic step of comparing the elapsed time since the PO with Time Level 1.

Figure 9:
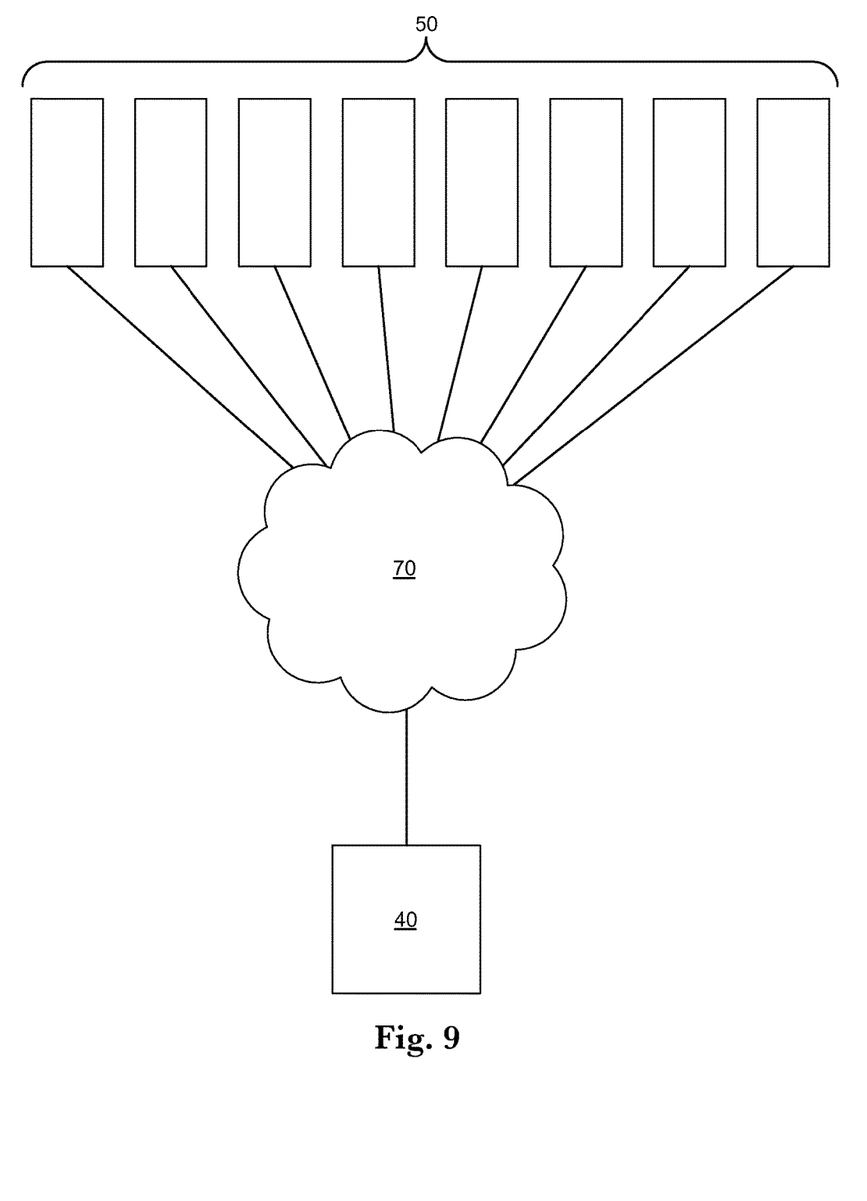
FIG. 9 is an electrical schematic representation of an exemplary embodiment of the system for preventing damage to products.

FIG. 9 is an electrical schematic representation of an exemplary embodiment of the system for preventing damage to products. Here, a plurality of display cases 50 are in communication with an internet/cellular network 70. Here, an operations center contains at least one CPU 40 which can communicate with the plurality of display cases 50 through the internet/cellular network 70.

The embodiments of the wireless communication and LCD system described herein can be used with any number of display case designs, either temperature controlled or not, and with doors that open or glass that remains stationary.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. An apparatus for preventing damage to products in a display case having a door, the apparatus comprising:
   a normally black transparent liquid crystal display comprising a number of pixels and positioned between a front glass and a rear glass of the door; and
   a controller electrically connected to the liquid crystal display and comprising a processor and a non-transitory storage device;

wherein the non-transitory storage device comprises preprogrammed transparency data which when executed by the processor causes the controller to drive the liquid crystal display according to the preprogrammed transparency data;

wherein the preprogrammed transparency data comprises multiple preprogrammed transparency levels for the liquid crystal display, each of which is associated with a respective time of day;

wherein said transparency levels are achieved by applying particular voltages to the pixels.

2. The apparatus of claim 1 further comprising:

a modem electrically connected with said controller and configured to receive said transparency data for the liquid crystal display and transmit said transparency data to the controller.

3. The apparatus of claim 2 wherein:

the transparency data includes data that instructs the liquid crystal display to drive each pixel at substantially the same transparency level.

4. The apparatus of claim 3 wherein:

the controller is configured to determine a current time and operate the liquid crystal display at the preprogrammed transparency level associated with a time of day corresponding to the current time.

5. The apparatus of claim 4 wherein:

each of the preprogrammed transparency levels is further associated with a respective date; and the controller is configured to determine a current date and operate the liquid crystal display at the preprogrammed transparency level associated with a date corresponding to the current date.

6. The apparatus of claim 3 further comprising:

a door sensor positioned to determine whether the door is open or closed, and transmit data indicating the status of the door to the controller.

7. The apparatus of claim 6 wherein:

the door status data is used to control the transparency level of the liquid crystal display.

8. The apparatus of claim 7 wherein:

the controller operates the liquid crystal display at normal transparency levels unless and until the time elapsed between door openings and closings, as detected by the door sensor, reaches a predetermined threshold, then the controller operates the liquid crystal at a reduced transparency level according to the transparency data.

* * * * *